United States Patent Office 3,605,704
Patented Sept. 20, 1971

3,605,704
VALVE ACTUATION MECHANISM WITH
CROSSED AXES PUSHRODS
Robert C. Gardner, Livonia, Mich., assignor to Ford
Motor Company, Dearborn, Mich.
Filed Apr. 30, 1970, Ser. No. 33,394
Int. Cl. F02b 75/22; F01l 1/14, 1/18
U.S. Cl. 123—55VE
5 Claims

ABSTRACT OF THE DISCLOSURE

An internal combustion engine having pairs of intake and exhaust pushrods in which the axes of each pair of pushrods are crossed when the engine is viewed laterally and positioned both to one side of the corresponding intake passage. This permits the intake passages formed within the cylinder head to be more effectively directed and significantly increased in cross-sectional area and engine performance to be correspondingly improved.

BACKGROUND OF THE INVENTION

This invention comprises an improved valve train for a conventional internal combustion engine having at least one bank of cylinders, block mounted camshaft and lifters, head mounted rocker arms and valves, and pushrods interconnecting the lifters and the rocker arms. In such engines the valve train elements generally are connected consecutively. That is, the first pushrod interconnects the longitudinally first lifter and rocker arm. The second pushrod interconnects the longitudinally second lifter and rocker arm and so on. Furthermore, the intake pushrod and the exhaust pushrod for a given cylinder generally are positioned one on each side of the intake passage. In such a design the spacing required between the lifters and between the rocker arms and the necessary wall thickness between passages combine to limit or impinge upon the desired cross-sectional area of the intake passages of the cylinder head.

This invention provides an internal combustion engine having a valve actuating mechanism in which the intake and exhaust valve trains are situated so as to permit increased cross-sectional areas of the intake passages and more direct routing of the intake passages through the cylinder head to the combustion chambers. The invention also permits the intake passages to be directed more toward the center of the combustion chamber than if the passage were bounded on both sides by pushrods. Furthermore, the invention provides an internal combustion engine design which is as economical to produce and as reliable in operation as current produced engines.

The increase in usable intake passage area is primarily the result of situating each pair of intake and exhaust valve pushrods so that their respective axes are crossed at intermediate portions of their lengths when the engine is viewed from a side in a direction perpendicular to the plane of the cylinder axes. The point of minimum spacing between each pair of intake and exhaust pushrods occurs adjacent the intake passage so as to utilize the increased space most effectively.

SUMMARY OF THE INVENTION

An internal combustion engine constructed in accordance with this invention includes a camshaft, an intake valve, an exhaust valve and means transferring motion from the camshaft to the valves which includes a pair of intake and exhaust valve pushrods having axes crossing intermediate their respective ends. Both the intake valve pushrod and the exhaust valve pushrod for a given cylinder are located on one side of the intake passage for that cylinder.

DETAILED DESCRIPTION OF THE PREFERRED EMBODIMENT

Figure 3:
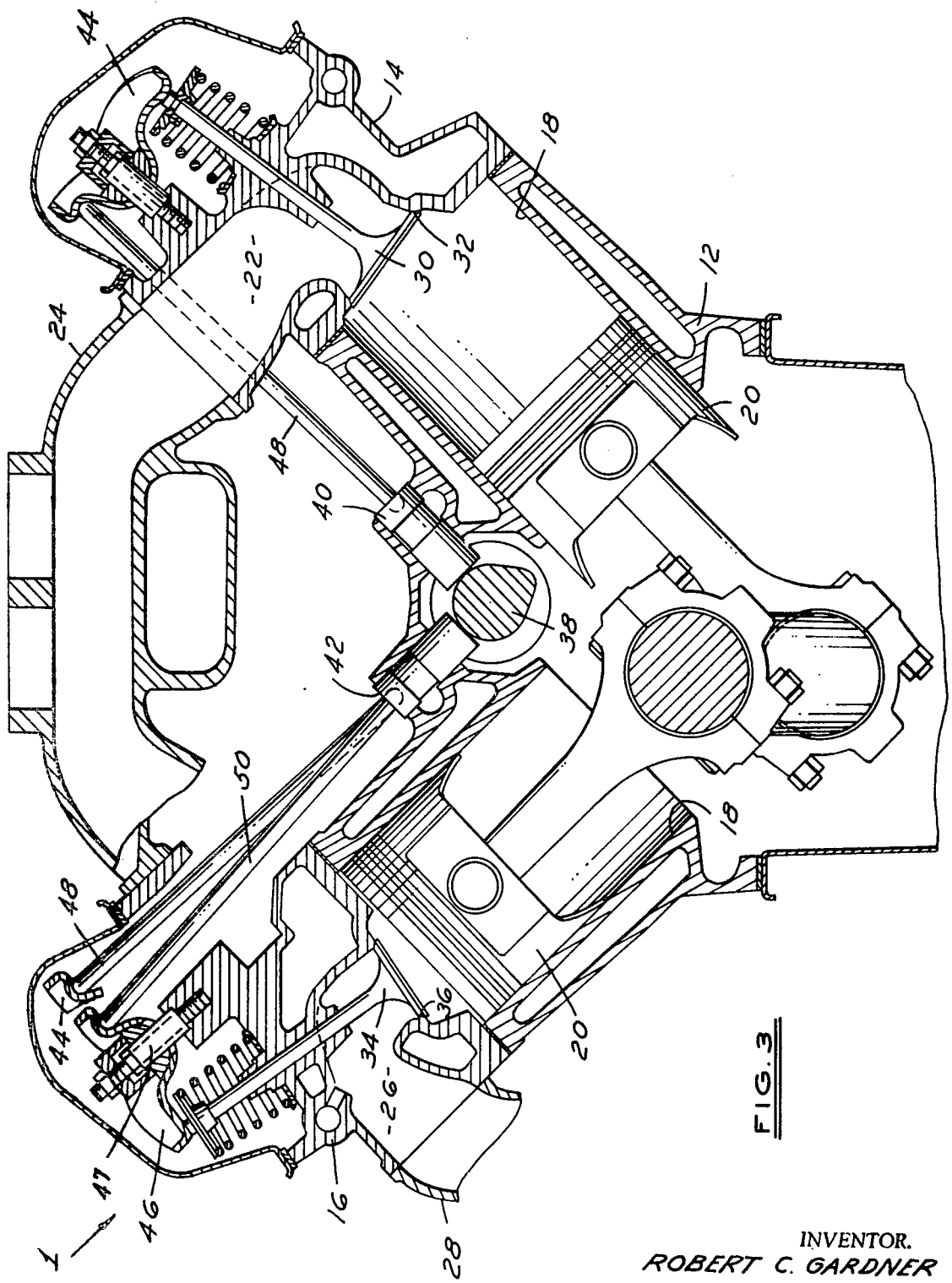
FIG. 3 shows transverse cross-sectional views of an internal combustion engine block and cylinder heads incorporating the invention.

A portion of a V-8 internal combustion engine is shown in FIG. 3 of the drawings including a block 12 and a pair of cylinder heads 14 and 16 attached thereto. Longitudinal banks of cylinders 18 are formed in the block which slidably receive a corresponding plurality of pistons 20. The cylinder heads 14 and 16 are formed with intake passages 22 leading from the intake manifold 24 to the cylinders 18 and with exhaust passages 26 leading from the cylinders 18 to the exhaust manifolds 28. Intake valves 30 are slidably and reciprocably mounted in the cylinder heads 14 and 16 and regulate flow through the intake passages 22 by opening and closing intake ports 32. Similarly, exhaust valves 34 are slidably and reciprocably mounted in the cylinder heads 14 and 16 and regulate flow through the exhaust passages 26 by opening and closing exhaust ports 36.

A camshaft 38 is rotatably mounted in the block 12. A plurality of cam followers or lifters 40 and 42 are reciprocably mounted in the block and slidably engage the camshaft. A number of rocker arms 44 are pivotally mounted on cylinder heads 14 and 16 by means of studs 45 and engage a corresponding number of intake valves 30. Similarly, a number of rocker arms 46 are pivotally mounted on the cylinder heads 14 and 16 by means of studs 47 and engage a corresponding number of exhaust valves 34. Pushrods 48 interconnect rocker arms 44 and lifters 40. Pushrods 50 interconnect rocker arms 46 and 30 to 34 to open and close according to a predetermined sequence and duration.

This invention is particularly well suited for, though not limited to, engines having stud-mounted rocker arms and angularly disposed intake and exhaust valves, as illustrated in the drawings of the preferred embodiment. As may be seen in FIG. 1, intake valve 30 and exhaust valve 34 are slanted in opposite directions from a transverse plane represented by line X—X, containing the centerline of the corresponding piston. Such slanted valves enable the combustion chamber to be more compactly and efficiently designed than is possible with parallel axis valves. It should also be noted that for engines having typical stud-mounted rocker arms the axes of the valve train components, viz, the pushrod axis, the rocker arm longitudinal axis and the corresponding valve axis, should lie within a common plane to operate at maximum efficiency. Accordingly, in this embodiment the longitudinal axes of pushrod 48, rocker arm 44 and valve 30 lie within a common plane; similarly, the longitudinal axes of pushrod 50, rocker arm 46 and exhaust valve 34 lie within another common plane.

Figure 1:
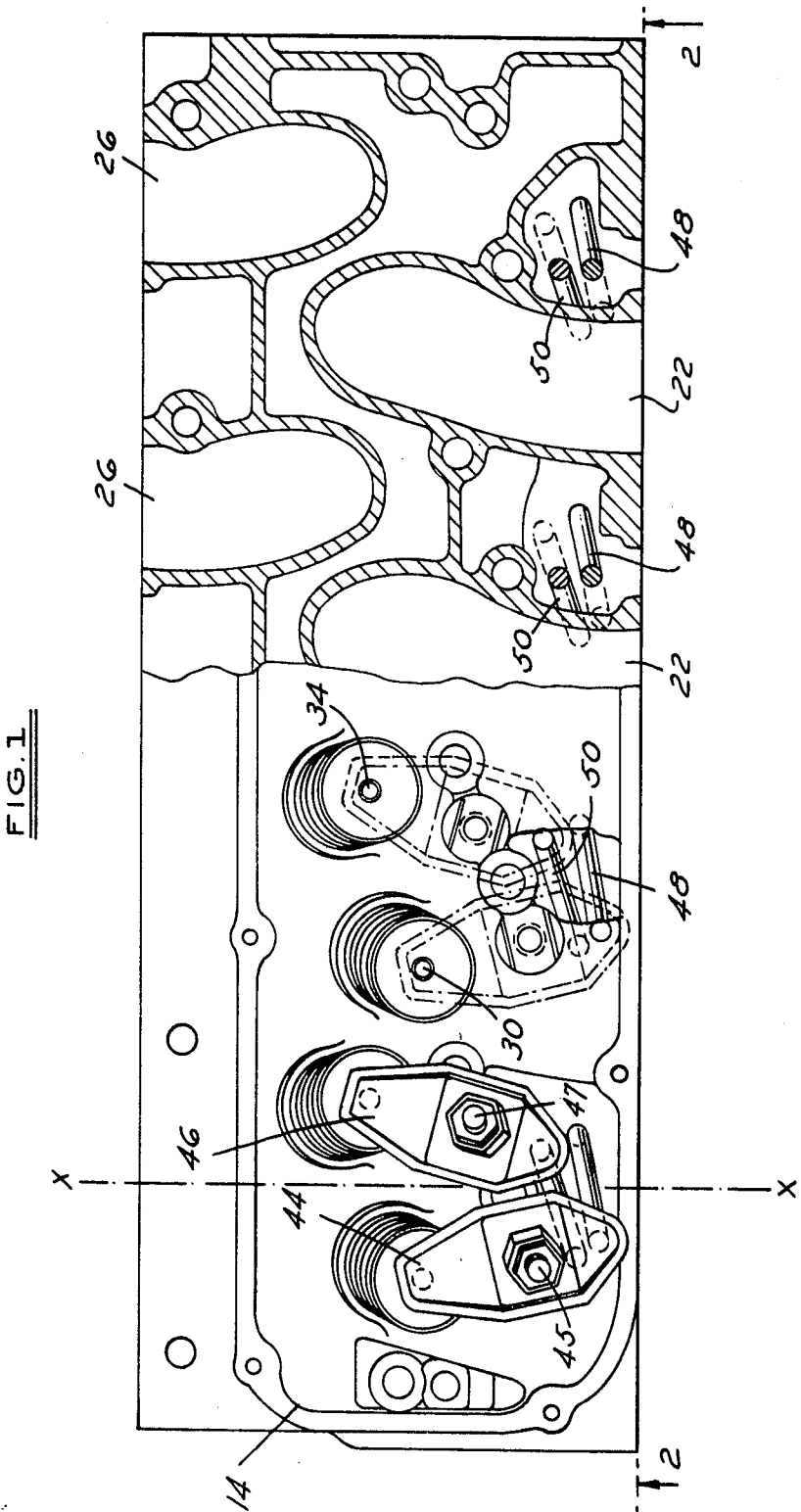
FIG. 1 is a plan elevational view of a cylinder head and attached valve train components in the direction of the arrow 1 in FIG. 3. A portion is broken away to illustrate the intake and exhaust passages.

The planes of the intake and exhaust valve trains in this embodiment, are arranged to diverge from the cylinder axis and from each other in camshaft-to-cylinder direction when the cylinder bank is viewed in side elevation, as shown in FIG. 1.

Figure 2:
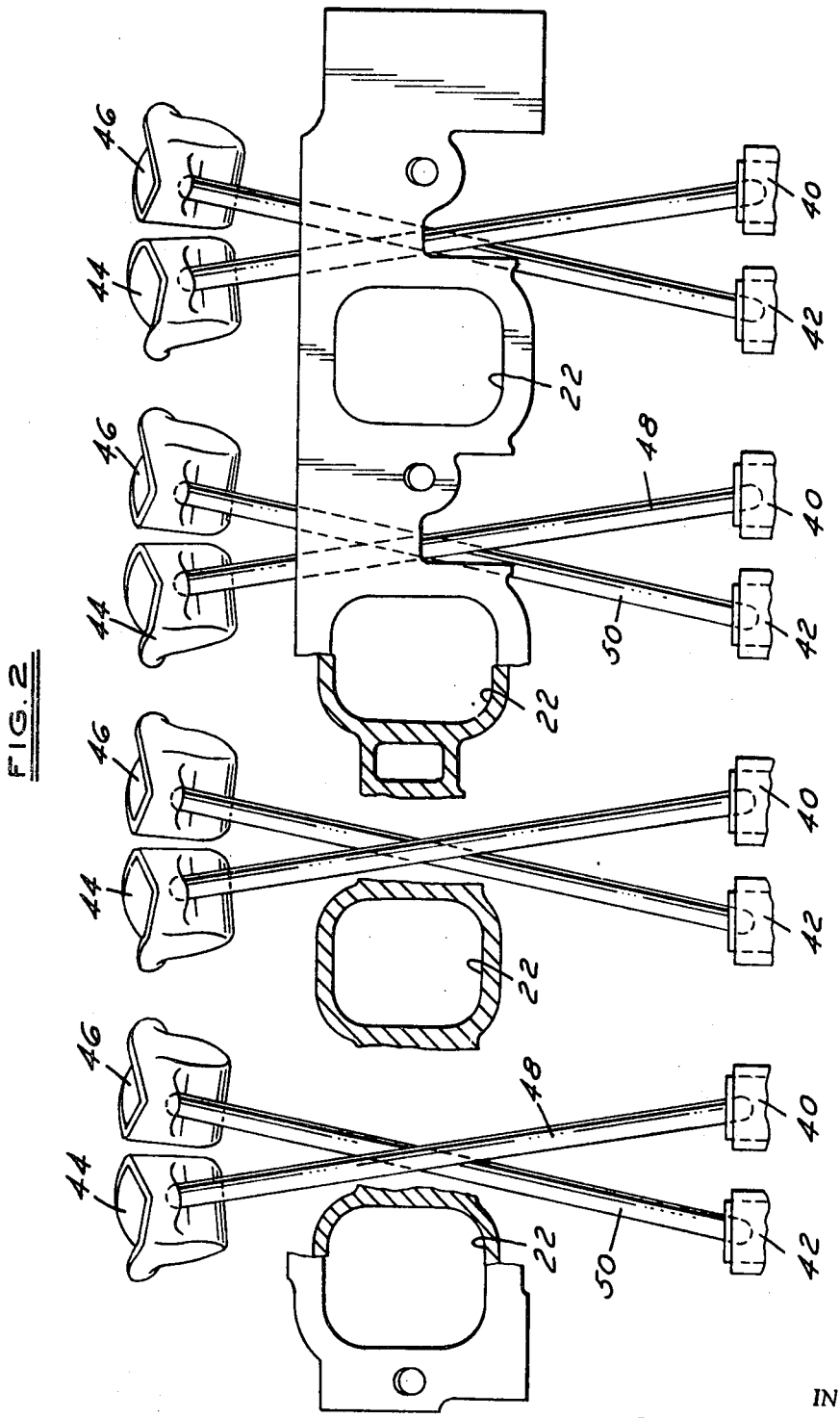
FIG. 2 is a side elevational schematic view along the line 2—2 of FIG. 1 showing the elevational relationship of the tappets, the rocker arms, pushrods and intake ports.

Intake valve pushrod 48 and exhaust valve pushrod 50 of the preferred embodiment have axes which cross approximately midway between their upper and lower ends when viewed laterally as in FIG. 2. The point of minimum spacing between each pair of pushrods 48 and 50 is adjacent the corresponding intake passage 22, thus permitting larger passages than is possible with a conventional valve train having consecutively connected rocker arms and tappets. The necessary spacing between the pushrods is obtained by a difference in the transverse positions of rocker arms 44 and 46, which may be seen in FIGS. 1 and 3 of the drawings.

The invention is not limited to V-8 engine configurations as illustrated in the drawings. In-line engines, opposed piston engines and other V-type engines may be constructed in accordance with this invention.

Further modifications and alterations will occur to those skilled in the art which are included within the scope of the following claims.

I claim:

1. In an internal combustion engine of the type having an engine block including a longitudinal bank of cylinders, a camshaft, an intake valve and an exhaust valve associated with each cylinder, means transferring motion from said camshaft to said valves, said means including a pair of reciprocable pushrods, said pushrods having axes crossed intermediate their respective opposite ends when the cylinder bank is viewed in side elevation.

2. In an internal combustion engine of the type comprising an engine block forming a longitudinal bank of cylinders, a camshaft, cam follower means engaging said camshaft, a cylinder head mountable on the block, intake and exhaust valve trains carried by the cylinder head for each cylinder in the bank, each valve train comprising a reciprocal valve in the head, a rocker arm engaging the valve, a pivotal connection between the rocker arm and the head, and a reciprocable pushrod having its ends engaged by the rocker arm and a respective cam follower means, the improvement comprising said valve trains being so arranged that the axes of the intake and exhaust pushrods for each cylinder are crossed intermediate their respective opposite ends when the cylinder bank is viewed in side elevation.

3. The improvement set forth in claim 2 wherein each valve train defines a plane, the planes of the intake and exhaust valve trains being arranged to diverge from the cylinder axis and from each other in camshaft-to-cylinder direction when the cylinder bank is viewed in side elevation.

4. In an internal combustion engine of the type comprising an engine block forming a longitudinal bank of cylinders, a camshaft positioned longitudinally within the block, reciprocal cam followers in the block, a cylinder head mountable on the block, an intake passage for each cylinder formed within the cylinder head, intake and exhaust valve trains carried by the cylinder head for each cylinder in the bank, each valve train comprising a reciprocal valve in the head, a rocker arm engaging the valve, a pivotal connection between the rocker arm and the head and a reciprocable pushrod having its ends engaged by the rocker arm and a respective cam follower, the improvement comprising said valve trains arranged so that the axes of the intake and exhaust pushrods for each cylinder are crossed intermediate their respective ends when the cylinder bank is viewed in side elevation, said pushrods having minimum spacing at generally intermediate portions of their lengths, said minimum spacing occurring adjacent the intake passage.

5. The improvement set forth in claim 4 wherein the rocker arms are individually spaced at predetermined longitudinal intervals of said engine, and the cam followers are individually spaced at predetermined longitudinal intervals of said engine, the longitudinally first of said cam followers being interconnected by one of said pushrods to the longitudinally second of said rocker arms, the longitudinally second of said cam followers being interconnected by another of said pushrods to the longitudinally first of said rocker arms.

References Cited

UNITED STATES PATENTS

| | | |
|---|---|---|
| 2,398,206 | 4/1946 | Chilton 123—90.39X |
| 2,744,513 | 5/1956 | Sampietro 123—191M |
| 2,864,351 | 12/1958 | Leach 123—90.41 |
| 2,930,366 | 3/1960 | Kolbe 123—90.41 |
| 3,045,655 | 7/1962 | Formia 123—30C |
| 3,159,148 | 12/1964 | Nallinger et al. 123—59AX |
| 3,240,190 | 3/1966 | Christian et al. 123—30C |
| 3,276,438 | 10/1966 | Keinath 123—90.42X |
| 3,411,490 | 11/1968 | Akana 123—188MX |
| 3,418,984 | 12/1968 | Skatsche 123—90.39 |

AL LAWRENCE SMITH, Primary Examiner

U.S. Cl. X.R.

123—59A, 90.41, 90.61